United States Patent

Steigelman

[15] 3,693,243
[45] Sept. 26, 1972

[54] METHOD AND APPARATUS FOR CLADDING METALS

[72] Inventor: James Q. Steigelman, Detroit, Mich.

[73] Assignee: W. M. Chace Company

[22] Filed: April 20, 1970

[21] Appl. No.: 29,962

[52] U.S. Cl. ........................29/487, 29/498, 228/5
[51] Int. Cl. ..........................................B23k 31/02
[58] Field of Search ..................29/498, 487; 228/4, 5

[56] References Cited

UNITED STATES PATENTS

| 1,443,082 | 1/1923 | Mauck | 29/487 |
| 1,615,591 | 1/1927 | Mallory | 29/487 UX |
| 2,332,368 | 10/1943 | Burtenshaw | 29/487 |
| 2,768,596 | 10/1956 | Kolbow et al. | 29/487 X |
| 3,165,829 | 1/1965 | Wardlaw | 29/498 X |
| 3,217,132 | 11/1965 | Schillinger | 29/498 UX |
| 3,406,445 | 10/1968 | Kopke et al. | 29/498 X |
| 3,504,428 | 4/1970 | Walter et al. | 29/498 X |
| 3,551,998 | 1/1971 | Bennett | 29/498 |
| 2,066,569 | 1/1937 | Kinkead | 228/5 X |
| 2,393,198 | 1/1946 | Somerville | 228/5 |
| 2,722,735 | 11/1955 | Beamish | 228/5 X |

FOREIGN PATENTS OR APPLICATIONS

| 613,928 | 2/1961 | Canada | 29/498 |

Primary Examiner—John F. Campbell
Assistant Examiner—Ronald J. Shore
Attorney—Norman J. O'Malley and Theodore C. Jay, Jr.

[57] ABSTRACT

A layer of a metal or alloy is clad to at least one surface of a substrate of another metal or alloy. The cladding process is carried out at elevated temperatures in order to produce a metallurgical bond at the interface between the layer and substrate. Normally, a substantial portion of the layer liquifies at these temperatures; however, the layer is cooled in a region remote from the interface during the cladding process to confine the liquification to the immediate region about the interface.

11 Claims, 4 Drawing Figures

PATENTED SEP 26 1972 3,693,243

INVENTOR.
JAMES Q. STEIGELMAN
BY Theodore Jay Jr.
ATTORNEY

METHOD AND APPARATUS FOR CLADDING METALS

BACKGROUND OF THE INVENTION

Certain types of memory core frames utilize a tri-laminate strip consisting of a substrate of a metal or alloy (such as copper) with two oppositely disposed outer layers of another metal or alloy (such as a copper silver-phosphorous brazing alloy) on opposite sides of the substrate, the layers being bonded metallurgically to the substrate. The use of a brazing alloy enhances the weldability of the copper to facilitate the attachment of fine wires thereto.

In my initial attempts to form a tri-laminate material from which the desired strip can be formed by subsequent metallurgical processing, I found that the minimum elevated temperature required to produce a metallurgical bond between such outer layers and substrate was high enough to melt a substantial portion of the outer layers, whereby the resulting structure was not metallurgically suitable to be used for its intended application. For example, using a brazing alloy consisting of 81 percent copper, 15 percent silver, 4 percent phosphorous, as applied to a copper substrate, I found that a temperature at the interface of at least 1,185° F was required to produce a metallurgical bond. However, a major portion of the brazing alloy melts at 1,185° F, forming a ternary eutectic liquid, while the remainder liquifies progressively over the range 1,185° F to 1,300° F. Consequently, structural integrity could not be maintained at these temperatures.

My invention overcomes these difficulties.

SUMMARY OF THE INVENTION

In my invention, at least on cladding layer of a metal or alloy is placed into contact with a substrate of another metal or alloy and a temperature gradient is established thereacross. The gradient is so designed that the interface is subjected to a temperature at which localized melting ensues and a metallurgical bond is formed and, at the same time, the layers are otherwise subjected to temperatures insufficiently high to produce melting.

The substrate, which has a melting temperature in excess of that of the cladding layer, is heated until the cladding layer melts at the interface. At the same time, heat is removed from the layer by cooling its outer surface, the rate of cooling being high enough to confine the melting action to the interface.

The substrate and layer can be held together under pressure while the substrate is heated and the layer is cooled. Alternatively, the substrate can be preheated prior to placing the layer and substrate together under pressure for further heating and cooling as previously described. If desired, the substrate can be sandwiched between two like outer layers under pressure, with the substrate being heated and the layers being cooled, to form a tri-laminate in one operation.

DETAILED DESCRIPTION OF PREFERRED EMBODIMENTS

Figure 1:
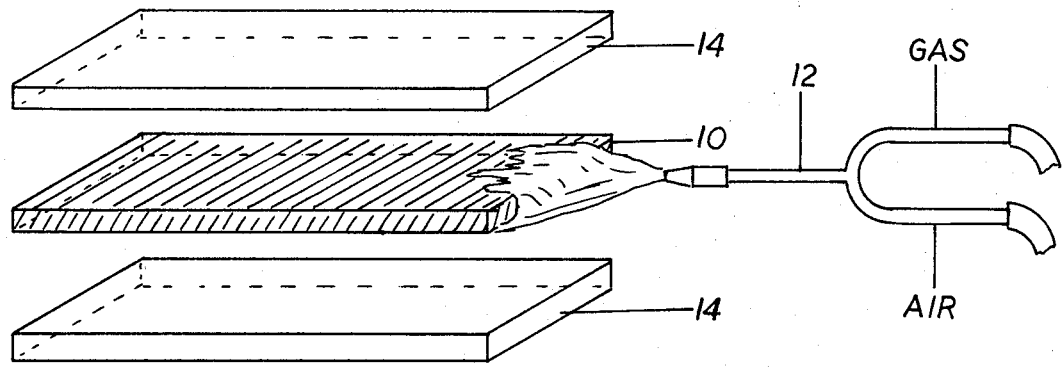
FIG. 1 illustrates a first step in forming a trilaminate in accordance with my invention.
Figure 2:
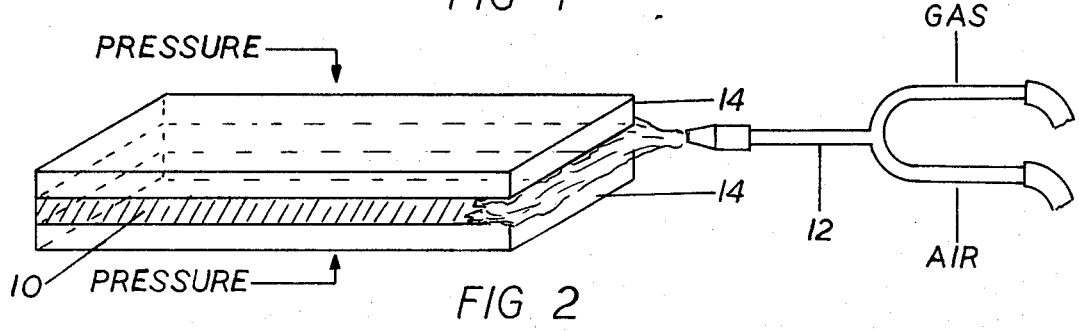
FIG. 2 illustrates a second step.
Figure 3:
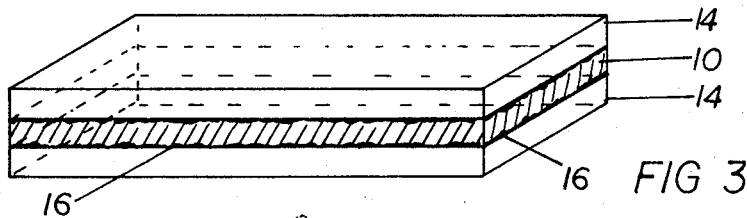
FIG. 3 illustrates a third step.
Figure 4:
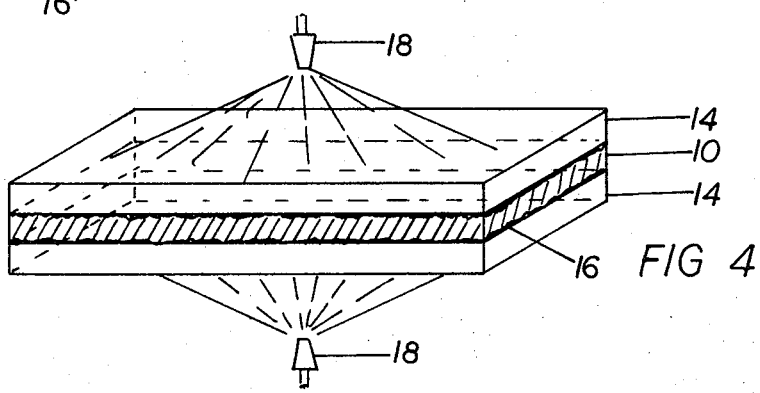
FIG. 4 illustrates a fourth step.

Referring now to FIGS. 1–4, a copper substrate 10 is preheated to a temperature of 1,700° F, for example, by being heated by torch 12 or passing an electric current therethrough. This and subsequent operations are preferably carried out in a reducing atmosphere such as hydrogen.

Oppositely disposed cladding layers 14 of a brazing alloy such as 81 percent copper, 15 percent silver and 4 percent phosphorous (all percentages given by weight) are clamped or otherwise held under pressure against opposite surfaces of the substrate 10. Additional heat is applied to the substrate to raise the temperature above that required to melt the cladding layer, the temperature remaining below that required to melt the copper. The temperature, for example, can be 1,300° F. Melting ensues at the interfaces as shown at 16.

At the same time, the outer surfaces of the layers 14 are cooled as, for example, by the use of water cooled back up plates. This cooling is shown symbolically by water sprays 18 in FIG. 4. In this manner, metallurgical bonding is obtained without structural impairment and the desired tri-laminate is produced. It can be subsequently worked metallurgically to desired shape and size.

It is essential that the substrate be hotter than the cladding layer to initiate melting at the interface only. Thus the substrate must have a melting temperature substantially in excess of that of the cladding layer to prevent the substrate from melting during processing.

Even when the substrate is preheated to the desired temperature, additional heat is required during application of the cladding layers; otherwise, excessive cooling of the substrate by heat transfer to the cladding layers will prevent interface melting.

The careful balance achieved by initiating melting at, but limiting melting to the interface, is obtained by establishing a temperature gradient across each cladding layer at which its interface with the substrate reaches melting temperature while the remainder of the layer remains solid. The interrelated variables are: the rate of heat input to the substrate; time; the pressure applied at the interface; and the rate of heat removal at the outer surfaces of the cladding layers. The process can be speeded up by controlling pressure with the use of hydraulic clamps and varying the rate of heat removal by using water cooled back up plates.

A quality bond can be obtained when the entire periphery of the interface is melted uniformly as shown at 16. However, if the mating surfaces are sufficiently flat and are held in contact under pressure, a liquid phase produced by melting at one soot will flow across the entire interface, presumably because of squeezing pressures or capilarity. In the latter case the bond is weaker in shear, but will hold together during hot rolling.

While I have described my invention with particular reference to preferred embodiments, my protection is o be limited only by the terms of the claims which follow.

What is claimed is:
1. A method of cladding a substrate of a first metal or alloy having a first melting temperature with an outer layer of a second metal or alloy having a second and lower melting temperature comprising the steps of:
placing said layer in contact with the substrate; and establishing a temperature gradient across the layer and substrate at which localized melting of the layer at the interface ensues and melting does not otherwise occur by heating the substrate to a third temperature intermediate the first and second temperatures and cooling the surface of the layer remote from the interface to a fourth temperature below said second temperature; and cooling the structure whereby a metallurgical bond between the layer and substrate is formed at the interface.

2. A method as set forth in claim 1 wherein said layer and substrate are held in contact under pressure.

3. A method as set forth in claim 2 wherein said substrate is preheated to a temperature intermediate the first and second temperatures prior to placing the layer and substrate into contact.

4. A method for cladding opposite surfaces of substrate of a first metal or alloy having a first melting temperature with corresponding outer layers of a second metal or alloy having a second and lower melting temperature comprising the steps of:

preheating the substrate to a temperature intermediate the first and second temperatures;

clamping said layers to the opposite surfaces of the substrate under pressure;

heating the substrate to a temperature intermediate the first and second temperatures whereby melting of the layers ensues at both interfaces;

cooling the layers in regions remote from the interfaces to confine melting to the interfaces; and cooling the structure whereby metallurgical bonds between substrate and layers are formed at the interfaces.

5. Apparatus for cladding a substrate of a first metal or alloy having a first melting temperature with an outer layer of a second metal or alloy having a second and lower melting temperature comprising:

first means to hold said substrate and layer together under pressure;

second means to heat said substrate to a third temperature intermediate the first and second temperatures; and third means to cool the outer surface of said layer to a temperature below said second temperature.

6. Apparatus as set forth in claim 5 wherein said first means are clamps or pressure cylinders.

7. Apparatus as set forth in claim 6 wherein said second means can heat said substrate by direct application of a flame or by passing current therethrough.

8. Apparatus as set forth in claim 7 wherein said third means includes water cooled back up plates.

9. Apparatus for cladding a substrate of a first metal or alloy having a first melting temperature with an outer layer of a second metal or alloy having a second and lower melting temperature comprising:

first means for placing said layer in contact with the substrate;

second means for establishing a temperature gradient across the layer and substrate at which localized melting of the layer at the interface ensues and melting does not otherwise occur; and third means for cooling the structure whereby a metallurgical bond between the layer and substrate is formed at the interface.

10. Apparatus as set forth in claim 9 wherein said temperature gradient is produced by heating the substrate to a third temperature intermediate the first and second temperatures and cooling the surface of the layer remote from the interface to a fourth temperature below said second temperature.

11. Apparatus as set forth in claim 9 wherein said substrate is preheated to a temperature intermediate the first and second temperatures prior to placing the layer and substrate into contact.

* * * * *